Feb. 3, 1925.
F. C. SHEFFEL
1,524,722
INDICATING DEVICE FOR TRACTORS
Filed June 6, 1924
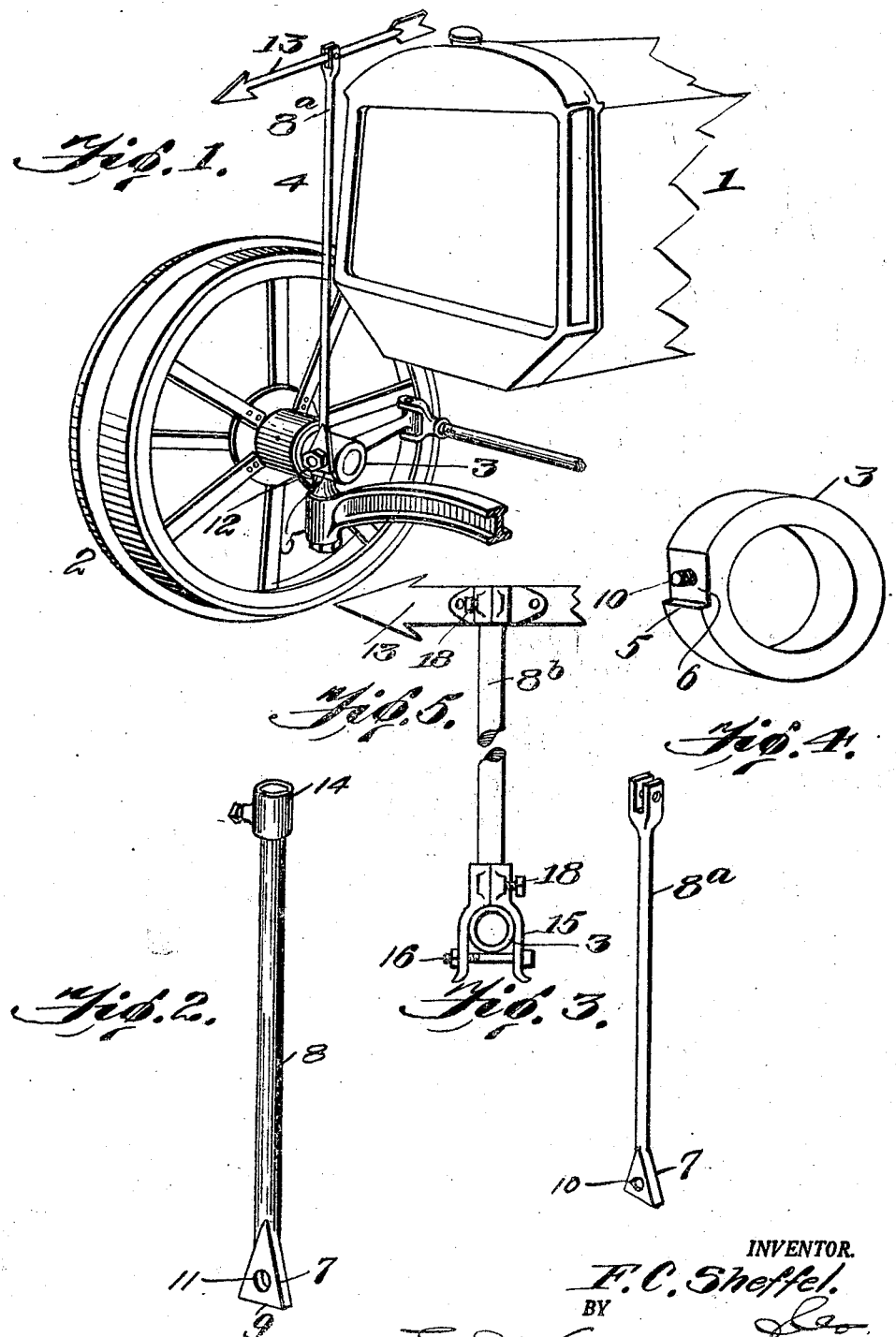
INVENTOR.
F. C. Sheffel.
BY
ATTORNEYS.

Patented Feb. 3, 1925.

1,524,722

UNITED STATES PATENT OFFICE.

FRED C. SHEFFEL, OF PRESCOTT, IOWA.

INDICATING DEVICE FOR TRACTORS.

Application filed June 6, 1924. Serial No. 718,295.

*To all whom it may concern:*

Be it known that I, FRED C. SHEFFEL, a citizen of the United States, residing at Prescott, in the county of Adams and State of Iowa, have invented certain new and useful Improvements in Indicating Devices for Tractors, of which the following is a specification, reference being had therein to the accompanying drawings.

This invention relates to an indicating device for tractors, and the object of the invention is the construction of a simple and efficient indicating device which is attached to the steering mechanism of a tractor, preferably to the stub of the steering knuckle of the right-hand wheel, with a view to indicating to the operator of a tractor the direction the wheel is starting to travel or "go" before it travels too far, in the cultivation of corn, or the like.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a framentary, perspective view of a tractor showing my improved indicating device attached thereto.

Figure 2 is a perspective view of the staff of the device, while—

Figure 3 is a framentary, perspective view of another embodiment of the staff.

Figure 4 is an enlarged, perspective view of the extended portion of the hub or inside stub of the steering knuckle of the right-hand wheel.

Figure 5 is another view in modified form of the embodiment as shown.

Referring to the drawings by numerals, 1 designates the tractor, 2 is the right-hand wheel provided with the steering knuckle 3 that carries the indicating device 4. The steering knuckle is preferably formed with an outwardly projecting lug 5, and with a flat face 6 above the lug (Fig. 4). The lower flattened end 7 of the staff 8 is placed against the flat face 6, with its lower end 9 resting against lug 5, and screw bolt 10 in aperture 11. A suitable nut 12 is placed upon the bolt 10, holding the staff 8 securely in its normal vertical position. Staffs 8 and 8ª are similarly constructed except that the upper end of the staff 8ª is bifurcated for receiving the indicating arrow 13, whereas staff 8 is provided with a collar 14 to receive any suitable means formed on arrow 13 for holding the arrow on staff 8.

It is to be understood that my device is for aiding in steering the tractor along the corn rows. From the position a person occupies, back on the cultivator, it is impossible to see the front wheel, or wheels, of the tractor, as it moves along the corn rows, and unless you can see the wheels, you cannot steer the machine accurately. Therefore, I provide my indicating device, and as a result the operator can see which way the wheel is starting to go before it goes too far, and as a consequence the management of the machine can be accomplished to a nicety which is very desirable since the operator must keep the right front wheel of the tractor within eight inches of the corn row. Every move that the front wheels of the tractor makes will be indicated by reason of the arrow showing clearly in line of vision of the operator.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a device of the class described, the combination with a steering knuckle, of a staff against said steering knuckle, a bolt extending from the steering knuckle through said staff and fastening the staff to said steering knuckle, and an indicating arrow carried by the staff.

2. In a device of the class described, the combination of a steering knuckle provided with an outwardly extending lug and with a flat face above said lug, a staff provided with a flat lower end, said flat lower end against the flat face of the steering knuckle, said flat lower end having its lowest edge bearing against said lug, a bolt extending from the flat face of said knuckle through said flat lower end of the staff, a nut on said bolt against said flat lower end, and an indicating arrow carried on the upper end of said staff.

3. In a device of the class described, the combination of a steering knuckle provided with a staff receiving face and with a lug thereunder, a staff against said face and bearing upon said lug, fastening means holding said staff upon said steering knuckle, and indicating means on said staff.

In testimony whereof I hereunto affix my signature.

FRED C. SHEFFEL.